Oct. 29, 1957 — M. J. PURETIC — 2,810,980
NET AND LONG LINE RETRIEVING DEVICE AND METHOD OF USING SAME
Filed Jan. 23, 1956
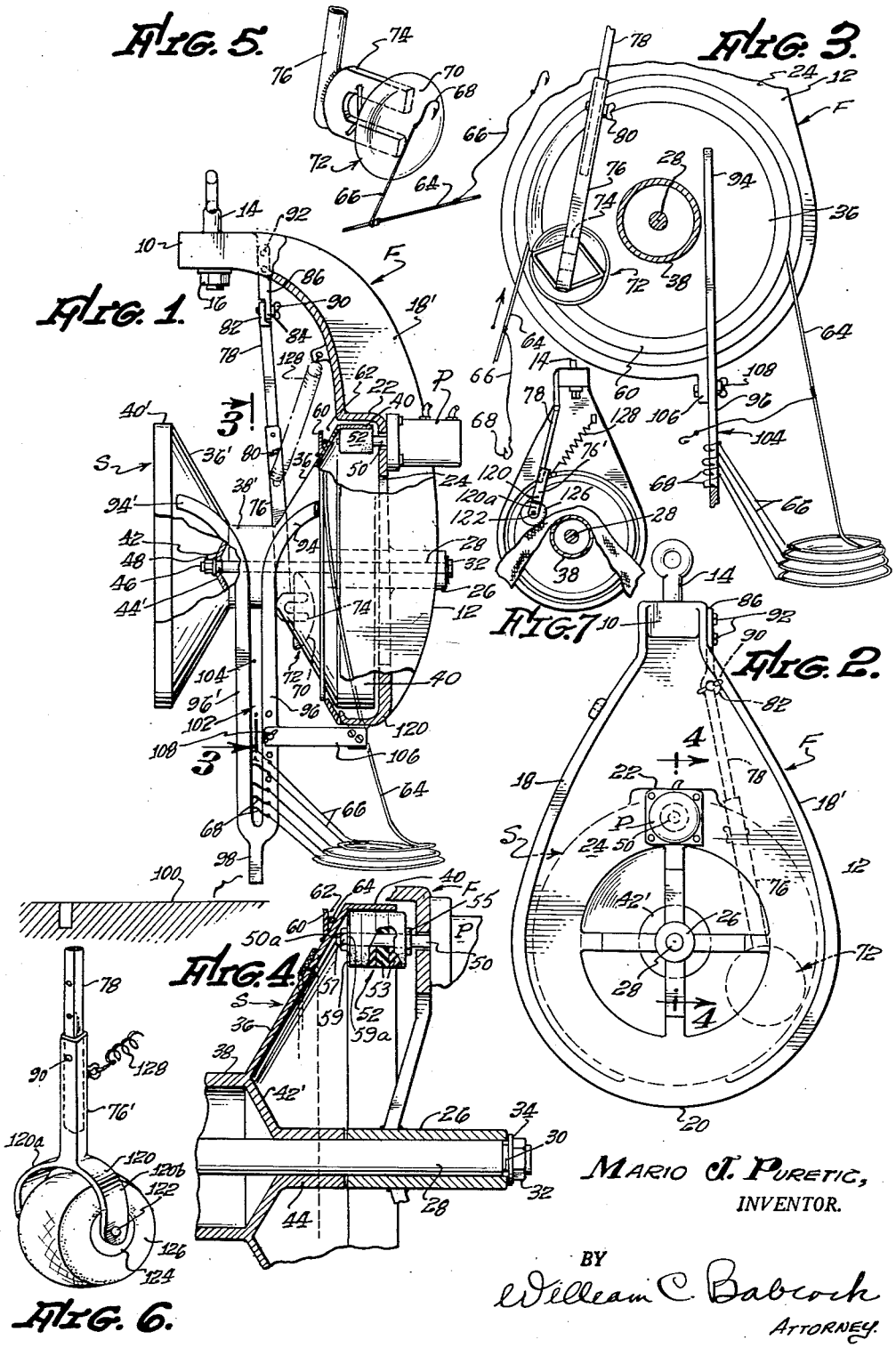
Mario J. Puretic,
INVENTOR.
BY William C. Babcock
ATTORNEY.

United States Patent Office 2,810,980
Patented Oct. 29, 1957

2,810,980

NET AND LONG LINE RETRIEVING DEVICE AND METHOD OF USING SAME

Mario J. Puretic, Torrance, Calif.

Application January 23, 1956, Serial No. 560,599

13 Claims. (Cl. 43—8)

The present invention relates generally to the field of commercial fishing, with particular reference to a power actuated block that can be used to retrieve either a net or long line from the sea and deposit same aboard ship in a desired stacked configuration, with the long line when so stacked having the hooks attached thereto deposited one above the other in an elongate confined space. This application is a continuation-in-part of pending application Serial No. 540,454, entitled One Man Net Retrieving and Boat Guiding Device and Method of Using Same, which was filed in the United States Patent Office on October 14, 1955.

A major object of the present invention is to provide a power block of simplified design, and one that is so versatile in operation that it can be used equally well for the handling of nets, as well as long lines to which a large quantity of hooks are affixed.

Another object of the invention is to provide a power block and associated assembly that so retrieves a long line from the sea that the hooks affixed thereto follow a predetermined path as the line is drawn aboard ship whereby the hooks are subsequently directed into a confined space in such a manner that the fisherman working with the line or net is not subjected to the hazard of injury from the barbed hooks.

Another object of the invention is to provide a device that is not only adapted to retrieve a long line from the sea in a more rapid and safe manner than can be done manually or with previously available equipment, but one by which the incoming hooks on the line may be stacked in a predetermined confined space where they may be easily baited and the personal injury hazard to the fishermen during the baiting operation is substantially reduced.

A still further object of the invention is to provide a power block and associated assembly that are of relatively simple structure, can be fabricated from standard commercially available materials, and retailed at a sufficiently low price as to permit profitable use thereof by both one-man boats as well as larger fishing vessels having a correspondingly larger crew.

These and other objects and advantages of the invention will become apparent from the following description of a preferred form thereof when taken in conjunction with the accompanying drawing illustrating that form in which:

Figure 1 is an end elevational view of the invention;
Figure 2 is a side elevational view of the device;
Figure 3 is a combined vertical cross-sectional and side elevational view of the device taken on line 3—3 of Figure 1;
Figure 4 is a fragmentary vertical cross-sectional view of the device showing the power operated means employed in actuating same;
Figure 5 is a perspective view of the portion of the invention that initially directs the hooks affixed to a long line along a predetermined path as said line is drawn from the sea;

Figure 6 is a perspective view of a device used in applying pressure to that portion of a net in contact with the power driven spool; and
Figure 7 is a side elevational view of the invention showing the device illustrated in Figure 6 mounted thereon.

Referring now to the drawings for the general arrangement of the invention, it will be seen to include a frame F of generally inverted L-shape that has a horizontally disposable leg 10 and a second leg 12 which curves downwardly therefrom, as can best be seen in Figure 1. The outer extremity of leg 10, as shown in Figure 2, is of solid construction and has a bore extending vertically therethrough in which an eye bolt 14 extends that is secured therein by a nut 16. Leg 12 (Figure 2) is defined by two identical downwardly and outwardly projecting flanges 18 and 18', the lower ends of which curve inwardly to join one another at point 20. A horizontal cross piece 22 extends between the upper interior surfaces of flanges 18 and 18', as shown in Figure 1. Cross piece 22 is provided with a vertical support 24 that depends downwardly therefrom and joins flanges 18 and 18' at point 20. At substantially the center of support 24 a tubular member 26 is rigidly affixed (Figure 4) which maintains a shaft 28 in the horizontal position shown in Figure 1. Threads 30 are formed on one projecting end of shaft 28, which threads are engaged by a nut 32. A washer 34 of larger diameter than the bore in tubular member and nut 32 to prevent leftward movement of shaft 28.

A spool S is provided that is defined by two laterally separated, rigid frusto-conical flanges 36 and 36', the inwardly disposed smaller ends of which are connected by a cylindrical shell 38. The outer circumferential edge of flange 36 develops into an annular rim 40, the details of which may best be seen in Figure 4. Shell 38 has two laterally spaced webs 42 and 42' extending inwardly toward shaft 28, which webs terminate in two hubs 44 and 44' respectively. Hubs 44 and 44' are rotatably mounted on shaft 28 with the free end of hub 44 being adjacently positioned to the inner end of tubular member 26. Shaft 28 has threads 46 formed on the outer end thereof that are engaged by a nut 48 which is adjacently disposed to the outer end of hub 44'.

It will be seen that due to the above described structure, spool S is rotatably supported on shaft 28 and maintained in the desired vertical alignment between tubular member 26 and nut 48. Although frame F and spool S may be fabricated in a number of different ways, it has been found desirable to cast both the frame and spool from a non-ferrous metal or plastic as an integral unit. The outer edge of frusto-conical flange 36' (Figure 1) develops into an annular rim 40' that is preferably narrower in width than the rim 40. Support 24, as can best be seen in Figures 1 and 4, has a prime mover such as an electric or air operated motor or an internal combustion engine or a hydraulic prime mover P mounted thereon which is adapted to rotate a shaft 50 that leads therefrom toward spool S. Shaft 50 is preferably provided with an annular driving member 52 rigidly affixed thereto that engages the inner surface of rim 40. By actuation of the prime mover P, the driving member 52 is rotated with the spool being concurrently rotated therewith and in the same direction.

The driving member 52, as may be seen in Figure 4, may be fabricated from a number of circular segments 53 of a resilient material such as rubber, the flat faces of which are in abutting contact. A flange 55 is rigidly mounted on shaft 50 at an appreciable distance from the free end thereof. Shaft 50 has a threaded end portion 50a that is engaged by a nut 57. A circular rigid pressure plate 59 having a centrally disposed bore 59a formed therein is mounted on shaft 50 and is positioned adjacent the end of driving member 52 opposite that situated adjacent flange 55. By tightening nut 57, it is moved to so compress the segments 53 that they frictionally engage one another to the extent that they rotate as an integral unit with shaft 50. The advantage of the driving member above described resides in the fact that an individual segment 53 can be easily removed when worn to be replaced by a new segment.

When the invention as above described is supported above the deck of a boat (not shown), and the end portion of a net (not shown) is disposed within the confines of the spool S, due to its weight, the net is compacted between flanges 36 and 36' and frictionally engaged thereby to such a degree that the net may be lifted from the sea and arranged on the boat deck in the desired stacked configuration.

By means of the auxiliary equipment which will hereinafter be described, the invention is adapted to be employed in retrieving a long line in a manner whereby the hooks affixed thereto are guided along a predetermined path and into a confined space as the line is drawn aboard ship and stacked on deck. This operation is achieved by the frusto-conical shell 36 on which a ring-shaped member 60 is welded or otherwise affixed to the outer exterior surface thereof, as shown in Figure 4. Member 60 occupies a substantially vertical position and defines an annular space 62 of transverse V-shaped cross section between the adjacent surfaces of the member 60 and flange 36. Thus when it is desired to retrieve a long line 64 from the sea, the line is simply dropped into space 62 (Figures 1 and 4) and the line is wedged therein to such a degree that the balance of the line in the water may be drawn inwardly toward spool S, and after passing thereover, dropped onto the boat deck or other supporting surface where it may be disposed in any desired arrangement. A plurality of laterally spaced leaders 66 are fastened to line 64, and a steel hook 68 is attached to the free ends of these leaders. Before the line is set each hook is baited. After a suitable length of time in the water, the long line 64 is retrieved therefrom by use of spool S as above described. Fish that have taken the bait and are affixed to hooks 68 are removed therefrom, with the leaders then being free to assume random positions relative to line 64.

However, as line 64 and leaders 66 start to pass over spool S, they come into contact with the convex face 70 of an annular plate 72, the details of which may best be seen in Figures 3 and 5. Adherence of hooks 68 to the curved face 70 is accomplished by means of a permanent or electro-magnet 74, whichever is desired, positioned directly behind plate 72, which magnet attracts or draws hooks 68 thereto. The magnet 74 and plate 72 are supported on the lower extremity of a rigid tubular rod 76 that slidably engages a second tubular rod 78 (Figure 1). Rods 76 and 78 are telescopically adjustable relative to one another and are held in the desired relationship by means of a thumb screw 80, or other suitable adjustment means. Rod 78 terminates at its upper extremity in an eye 82 that is adjacent a second eye 84 formed on the lower end of a supporting member 86 that depends downwardly from leg 10 of frame F. A thumb screw 90 engages the two eyes 82 and 84 to hold them in the desired angular position relative to one another. The extreme upper portion of member 86 is affixed to leg 10 by screws 92 or the like.

Thus, the position of plate 72 and magnet 74 can be adjusted relative to spool S to direct hooks 68 onto the upper circumferential surface of flange 36, where the hooks will be carried thereon until they encounter a curved downwardly and inwardly extending guide 94 shown in Figure 1. The lower end of guide 94 terminates in a straight leg 96, the lower end of which develops into a downwardly extending member 98, which member if desired, can be sufficiently long as to permit the lower end thereof to rest on the boat deck 100. A second leg 96' projects upwardly from support 98, with leg 96' being laterally spaced from leg 96 and the two legs cooperatively defining a rack 102 that has an elongate, vertical confined space 104 formed therein. The upper end of leg 96' develops into a curved guide 94' which is substantially identical to the previously described guide 94. Rack 102 is removably supported in the desired position by a horizontal member 106 that is rigidly but removably affixed to the lower portion of frame F (Figure 1) by a thumb screw 108 or other suitable removable fastening means.

From the above description it will be seen that as the long line is drawn from the sea after it is engaged in space 62 of spool S, the hooks 68 are directed along a predetermined path as the frusto-conical flange 36 rotates, and the hooks are guided from the flange surface by guide 94 into confined space 104 of rack 102, with the line and its leaders 66 being directed downwardly onto the deck in the desired arrangement. When the line is stacked in this manner on the deck, the leaders attached thereto extend outwardly therefrom in an orderly fashion and the hooks thereon are disposed one above the other in space 104 of rack 102. When one of the racks 102 is filled with hooks, the rack is removed from the frame F and laid beside the portion of the line from which the leaders 66 extend. Another empty rack 102 is then affixed to the frame, and used to receive hooks until it too is filled. In this manner the hooks on the leaders 66 are not free to move, but are held in the confined spaces 104 of racks 102 when the line is lying on the deck 100. Thus the hazard of personal injury to the crew from the barbed hooks is substantially eliminated. It will be obvious that this hazard is also greatly diminished during the time the line or net is being drawn from the sea as the hooks are controlled by plate 72 and not permitted to move freely about during line and boat movement as heretofore has been the case.

When the invention is used in retrieving a net from the sea, and particularly when it is disposed at a relatively low elevation above the boat deck, the auxiliary equipment shown in Figures 6 and 7 may be used to advantage. The form of invention so shown includes either an elongate rod or tube 76', the lower end portion of which develops into a yoke 120 that supports a shaft 122 between the two legs 120a and 120b thereof. Shaft 122 rotatably supports a hub 124 on which an annulus shaped resilient body 126, such as a low pressure pneumatic tire or the like, is mounted. In transverse cross section body 126 is substantially the same as the width of cylindrical member 38.

The tube or rod 76' is telescopically adjustable relative to the tube or rod 78 previously described, and is held in the desired longitudinal position relative thereto by use of screw 90, or other suitable removable fastening means. A tensioned helical spring 128 is affixed to rod 76' and a convenient portion of frame F by means of a bracket or the like, and at all times it tends to pivot rod or tube 76' and rod or tube 78 inwardly so that body 126 will tend to move toward cylindrical member 38, and compact the net to frictionally engage spool S in order that the net may be moved thereby. The diameter of the body 126 (Figure 7) is sufficiently small that the ring-shaped member 60 is not contacted, whereby the invention can be used either for net or line retrieving purposes when in the form shown. When a line is being drawn in, to which hooks are attached, the tube or rod 76' is telescoped upwardly to an elevated position where it is locked by screw 90. The hooks are then free to pass over spool S without contacting body 126.

It will be apparent that when a net is in contact with spool S and the exterior surface of the net is movably engaged by body 126, that sufficient pressure will be exerted on the net to prevent the occurrence of any slipping between the net and spool. Thus the spool S can be used efficiently to retrieve a net from the sea, even though the net is relatively light in weight and the spool S is disposed at a relatively low elevation relative to the boat deck. From the above description it can be employed in retrieving either a net or long line from the sea.

The operation of the invention has been previously described in detail and need not be repeated herein.

Although the invention herein shown and described is fully capable of achieving the objects and providing the advantages hereinbefore mentioned, it is to be understood that it is merely illustrative of the presently preferred embodiment of the invention and that I do not mean to be limited to the details of construction herein shown and described other than as defined in the appended claims.

I claim:

1. An apparatus for use in raising a long line to which a plurality of laterally spaced steel fish hooks, or a fish net, are adapted to be attached to an elevated position above a boat deck from which position said line or net can be subsequently lowered and arranged in a desired stacked configuration on said deck, including: a shaft; a frame capable of supporting said shaft in a substantially horizontal position; a spool formed with two laterally spaced, oppositely disposed, outwardly tapering annular surfaces, the taper of which surfaces in such that said net is compacted when passing therebetween to a degree that said net frictionally engages said surfaces and can be raised to said elevated position, with said spool being rotatably supported on said shaft; means provided on at least one of said surfaces that is adapted to frictionally engage said line and raise portions thereof in sequence to said elevated position; a prime mover supported from said frame; a driving pulley that frictionally engages a portion of said spool, said pulley being driven by said prime mover; and support means that permit said frame to be disposed at an elevated position above said deck.

2. An apparatus as defined in claim 1 in which said spool is provided with an outwardly extending circular rim, and said driving pulley frictionally engages said rim.

3. An apparatus as defined in claim 1 in which said driving pulley is formed from a resilient material.

4. An apparatus as defined in claim 1 in which said frictional line-engaging means is a rigid ring so mounted on said spool that said ring and one of said spool surfaces cooperate to define a circumferentially extending confined space of V-shaped transverse cross section that frictionally engages that portion of said line in contact with said spool.

5. An apparatus as defined in claim 4 in which magnetic means are provided that attract said hooks and cause said hooks to remain in a predetermined area when said hooks are in contact with said spool.

6. An apparatus as defined in claim 5 in which said magnetic means includes a curved surface to which said hooks are drawn as said hooks approach said spool.

7. An apparatus as defined in claim 6 in which a rack is provided that has an elongate confined space formed therein and guide means for directing said hooks from said predetermined area into said confined space as said spool rotates.

8. An apparatus as defined in claim 7 in which said rack is movable relative to said frame to permit said rack when containing a plurality of hooks to be disposed adjacent the retrieved line to which said hooks are affixed.

9. An apparatus as defined in claim 8 that is provided with a first member which is movably supported from said frame and a second member, said magnetic means being supported from said second member, and locking means adapted to hold said first and second members together in the desired longitudinal position relative to one another.

10. An apparatus for use in raising a long line to which a plurality of laterally spaced steel fish hooks are attached, or a fish net, to an elevated position above a boat deck from which position said line or net can be subsequently lowered and arranged in a desired stacked configuration on said deck, including: a shaft; a frame capable of supporting said shaft in a substantially horizontal position; a spool formed with two laterally spaced, oppositely disposed, outwardly tapering annular surfaces, the taper of which surfaces is such that said net is compacted when passing therebetween to a degree that said net frictionally engages said surfaces and can be raised to said elevated position, with said spool being rotatably supported on said shaft; means provided on at least one of said surfaces that frictionally engage said line and raise portions thereof in sequence to said elevated poistion; power means that rotate said spool; support means that permit said frame to be disposed at an elevated position above said deck; and spring-loaded pressure means adjacent said spool disposed inwardly from said line engaging means that engage the net as said net passes over said spool and applies sufficient pressure to that portion of said net in contact with said spool that there is no slippage between said net and spool as said spool rotates.

11. An apparatus for use in raising a long line to which a plurality of laterally spaced steel fish hooks are attached, or a fish net, to an elevated position above a boat deck from which position said line or net can be subsequently lowered and arranged in a stacked configuration on said deck, including: a shaft; a frame capable of supporting said shaft in a substantially horizontal position; a spool formed with two laterally spaced, oppositely disposed, outwardly tapering annular surfaces capable of engaging said line, said taper of said surfaces being such that said net is compacted when passing therebetween to the extent that it frictionally engages said surfaces and can be raised to said elevated position, with said spool being rotatably supported on said shaft; a circular rim mounted on and extending outwardly from one side of said spool; a prime mover supported from said frame; a driving pulley that frictionally engages the interior surface of said rim and is shielded from water brought onto said spool by said net or line, which spool is capable of being rotated by said prime mover; and support means that permit said frame to be disposed at an elevated position above said deck.

12. An apparatus as defined in claim 11 wherein said prime mover is provided with a shaft, said pulley is formed of a plurality of resilient circular segments the flat faces of which are in abutting contact, and means is provided to prevent rotation of said segments relative to said shaft.

13. An apparatus as defined in claim 12 wherein said shaft is provided with a threaded end portion, and a flange rigidly affixed to said shaft inwardly from said end portion, a pressure plate provided with a bore therein which is slidably mounted on said shaft after said segments are mounted thereon and a nut that engages said threaded end portion, said nut when tightened moving said plate toward said flange to compress said segments therebetween.

References Cited in the file of this patent

UNITED STATES PATENTS

| | | |
|---|---|---|
| 2,733,530 | Puretic | Feb. 7, 1956 |
| 2,733,531 | Puretic | Feb. 7, 1956 |